US012274917B2

(12) United States Patent
Lee (10) Patent No.: US 12,274,917 B2
(45) Date of Patent: Apr. 15, 2025

(54) METHOD, DEVICE, AND NON-TRANSITORY COMPUTER-READABLE RECORDING MEDIUM FOR ESTIMATING INFORMATION ON GOLF SWING

(71) Applicant: MOAIS, INC., Seoul (KR)

(72) Inventor: Yong Geun Lee, Seoul (KR)

(73) Assignee: MOAIS, INC., Seoul (KR)

( * ) Notice: Subject to any disclaimer, the term of this patent is extended or adjusted under 35 U.S.C. 154(b) by 299 days.

(21) Appl. No.: 17/765,581

(22) PCT Filed: Sep. 24, 2020

(86) PCT No.: PCT/KR2020/012996
§ 371 (c)(1),
(2) Date: Mar. 31, 2022

(87) PCT Pub. No.: WO2021/066392
PCT Pub. Date: Apr. 8, 2021

(65) Prior Publication Data
US 2022/0362630 A1    Nov. 17, 2022

(30) Foreign Application Priority Data
Oct. 2, 2019 (KR) .......................... 10-2019-0122661

(51) Int. Cl.
A63B 24/00 (2006.01)
A63B 69/36 (2006.01)
(Continued)

(52) U.S. Cl.
CPC ...... *A63B 24/0003* (2013.01); *A63B 24/0062* (2013.01); *A63B 69/3623* (2013.01);
(Continued)

(58) Field of Classification Search
CPC ............ A63B 24/0003; A63B 24/0062; A63B 69/3623; G06T 7/70; G06V 40/28; G06V 10/82
See application file for complete search history.

(56) References Cited

U.S. PATENT DOCUMENTS 10,856,744 B2 * 12/2020 Yuen ..................... G01C 22/006
11,270,455 B2 *  3/2022 Zhang ................... G06V 40/23
(Continued)

FOREIGN PATENT DOCUMENTS

JP    2014530047 A    11/2014
JP    2018153295 A    10/2018
(Continued)

OTHER PUBLICATIONS

International Search Report of PCT/KR2020/012996 dated Feb. 26, 2021.

*Primary Examiner* — Malina D. Blaise
(74) *Attorney, Agent, or Firm* — Dinsmore & Shohl LLP; Yongsok Choi, Esq.

(57) ABSTRACT

A method for estimating information on a golf swing is provided. The method includes the steps of: when a photographed image of a user's golf swing is acquired, detecting at least one joint of the user from the photographed image using an artificial neural network model; and estimating information on the user's golf swing with reference to a position of the at least one detected joint.

8 Claims, 4 Drawing Sheets

(51) Int. Cl.
    *G06T 7/70*         (2017.01)
    *G06V 10/82*      (2022.01)
    *G06V 40/20*      (2022.01)
    *A63B 102/32*     (2015.01)

(52) U.S. Cl.
    CPC ............... *G06T 7/70* (2017.01); *G06V 10/82* (2022.01); *G06V 40/28* (2022.01); *A63B 2102/32* (2015.10); *A63B 2220/05* (2013.01); *A63B 2220/807* (2013.01); *G06T 2207/20084* (2013.01); *G06T 2207/30196* (2013.01); *G06T 2207/30221* (2013.01)

(56) References Cited

U.S. PATENT DOCUMENTS

| | | | | |
|---|---|---|---|---|
| 2007/0015611 A1* | 1/2007 | Noble | ........... | A61B 5/1126 473/450 |
| 2012/0040317 A1* | 2/2012 | Anderson | .......... | A63B 69/3623 473/409 |
| 2012/0236030 A1* | 9/2012 | Border | ........... | G06F 3/013 345/633 |
| 2013/0053190 A1* | 2/2013 | Mettler | ........... | A63B 24/0062 473/422 |
| 2013/0266918 A1* | 10/2013 | Tinjust | ........... | A63B 24/0087 700/91 |
| 2013/0316840 A1* | 11/2013 | Marks | ........... | G09B 19/0038 473/202 |
| 2014/0139454 A1* | 5/2014 | Mistry | ........... | G06F 3/017 345/173 |
| 2014/0143784 A1* | 5/2014 | Mistry | ........... | G06F 3/0488 718/102 |
| 2014/0342844 A1* | 11/2014 | Mooney | ........... | G09B 19/0038 473/266 |
| 2015/0317910 A1* | 11/2015 | Daniels | ........... | G09B 9/00 434/257 |
| 2016/0292881 A1* | 10/2016 | Bose | ........... | G11B 27/10 |
| 2017/0061817 A1* | 3/2017 | Mettler May | ........ | A61B 5/1124 |
| 2017/0262697 A1* | 9/2017 | Kaps | ........... | G11B 27/022 |
| 2017/0332946 A1* | 11/2017 | Kikkeri | ........... | A61B 5/1114 |
| 2018/0104573 A1* | 4/2018 | Jeffery | ........... | G06F 3/017 |
| 2019/0347826 A1* | 11/2019 | Zhang | ........... | G06N 3/08 |
| 2019/0371028 A1* | 12/2019 | Harrises | ........... | G02B 27/0101 |
| 2020/0074165 A1* | 3/2020 | Ghafoor | ........... | G06V 40/103 |
| 2020/0193864 A1* | 6/2020 | Fang | ........... | A63B 60/46 |
| 2021/0045678 A1* | 2/2021 | Narayan | ........... | A61B 5/40 |
| 2021/0158501 A1* | 5/2021 | Bhat | ........... | A63B 24/0062 |
| 2021/0200993 A1* | 7/2021 | Chen | ........... | G06V 10/82 |
| 2023/0072423 A1* | 3/2023 | Osborn | ........... | G16H 20/30 |
| 2023/0260552 A1* | 8/2023 | Bose | ........... | H04N 5/765 463/31 |
| 2023/0285802 A1* | 9/2023 | Lee | ........... | A63B 69/36 |

FOREIGN PATENT DOCUMENTS

| | | |
|---|---|---|
| KR | 1020050080492 A | 8/2005 |
| KR | 1020090105031 A | 10/2009 |
| KR | 101428922 B1 | 8/2014 |
| KR | 1020160121379 A | 10/2016 |
| KR | 1020190019824 A | 2/2019 |

* cited by examiner

METHOD, DEVICE, AND NON-TRANSITORY COMPUTER-READABLE RECORDING MEDIUM FOR ESTIMATING INFORMATION ON GOLF SWING

CROSS REFERENCE TO RELATED APPLICATIONS

This application is a national phase of International Application No. PCT/KR2020/012996 filed on Sep. 24, 2020, which claims priority to Korean Patent Application No. 10-2019-0122661 filed on Oct. 2, 2019, the entire contents of which are herein incorporated by reference.

FIELD OF THE INVENTION

The present invention relates to a method, device, and non-transitory computer-readable recording medium for estimating information on a golf swing.

BACKGROUND

As golf has become popular recently, techniques for analyzing images of a golfer's swing and providing useful information to the golfer have been introduced.

As an example of related conventional techniques, Korean Laid-Open Patent Publication No. 2009-105031 discloses a golf clinic system employing image processing techniques and an operation method thereof, the system comprising: a plurality of markers attached to a body and a golf club of a golf practitioner; a plurality of cameras for collecting images of a swing motion of the golf practitioner; an image analyzer for reconstructing two-dimensional images collected from the plurality of cameras into three-dimensional images, extracting spatial coordinates of the markers according to movements, and analyzing angular values of parts of the body and data for each stage in real time to output a clinic result in a report format; and a database in which kinematic clinic information on the swing motion is matched with member information and stored as digital data.

However, according to the techniques introduced so far as well as the above-described conventional technique, it is necessary to separately use an expensive instrument for recognizing a golfer's posture and motion, or to attach separate sensors (or markers) to the golfer's body and golf club, in order to analyze the golfer's swing.

SUMMARY OF THE INVENTION

One object of the present invention is to solve all the above-described problems in prior art.

Another object of the invention is to detect at least one joint of a user from a photographed image of the user's golf swing using an artificial neural network model, and estimate information on the user's golf swing with reference to a position of the at least one detected joint.

Yet another object of the invention is to light-weight an artificial neural network model using depthwise convolution and pointwise convolution, and detect at least one joint of a user from a photographed image of the user's golf swing using the light-weighted artificial neural network model.

The representative configurations of the invention to achieve the above objects are described below.

According to one aspect of the invention, there is provided a method for estimating information on a golf swing, the method comprising the steps of: when a photographed image of a user's golf swing is acquired, detecting at least one joint of the user from the photographed image using an artificial neural network model; and estimating information on the user's golf swing with reference to a position of the at least one detected joint.

According to another aspect of the invention, there is provided a device for estimating information on a golf swing, the device comprising: a joint detection unit configured to, when a photographed image of a user's golf swing is acquired, detect at least one joint of the user from the photographed image using an artificial neural network model; and a golf swing information estimation unit configured to estimate information on the user's golf swing with reference to a position of the at least one detected joint.

In addition, there are further provided other methods and devices to implement the invention, as well as non-transitory computer-readable recording media having stored thereon computer programs for executing the methods.

According to the invention, it is possible to detect at least one joint of a user from a photographed image of the user's golf swing using an artificial neural network model, and estimate information on the user's golf swing with reference to a position of the at least one detected joint, thereby estimating the information on the user's golf swing with only the photographed image, without using any separate sensor or instrument.

According to the invention, it is possible to light-weight an artificial neural network model using depthwise convolution and pointwise convolution, and detect at least one joint of a user from a photographed image of the user's golf swing using the light-weighted artificial neural network model in a mobile device, thereby accurately and efficiently estimating the information on the user's golf swing in the mobile device, without using any separate sensor or instrument.

DETAILED DESCRIPTION

In the following detailed description of the present invention, references are made to the accompanying drawings that show, by way of illustration, specific embodiments in which the invention may be practiced. These embodiments are described in sufficient detail to enable those skilled in the art to practice the invention. It is to be understood that the various embodiments of the invention, although different from each other, are not necessarily mutually exclusive. For example, specific shapes, structures, and characteristics described herein may be implemented as modified from one embodiment to another without departing from the spirit and scope of the invention. Furthermore, it shall be understood that the positions or arrangements of individual elements within each embodiment may also be modified without departing from the spirit and scope of the invention. Therefore, the following detailed description is not to be taken in a limiting sense, and the scope of the invention is to be taken as encompassing the scope of the appended claims and all equivalents thereof. In the drawings, like reference numerals refer to the same or similar elements throughout the several views.

Hereinafter, various preferred embodiments of the present invention will be described in detail with reference to the accompanying drawings to enable those skilled in the art to easily implement the invention.

Although embodiments related to a golf swing are described herein focusing on a full swing, the golf swing according to the invention should be understood in the broadest sense as encompassing all motions for moving a golf club. For example, the golf swing according to one embodiment of the invention may include a full swing, a half swing, a chip shot, a lobe shot, and a putt.

Although the descriptions herein are focused on golf, it will be apparent to those skilled in the art that the present invention may be utilized even for estimating information on motions performed in sports other than golf. For example, the present invention may be utilized for estimating information on a baseball swing or information on a workout or yoga posture.

Configuration of a Device

Figure 1:
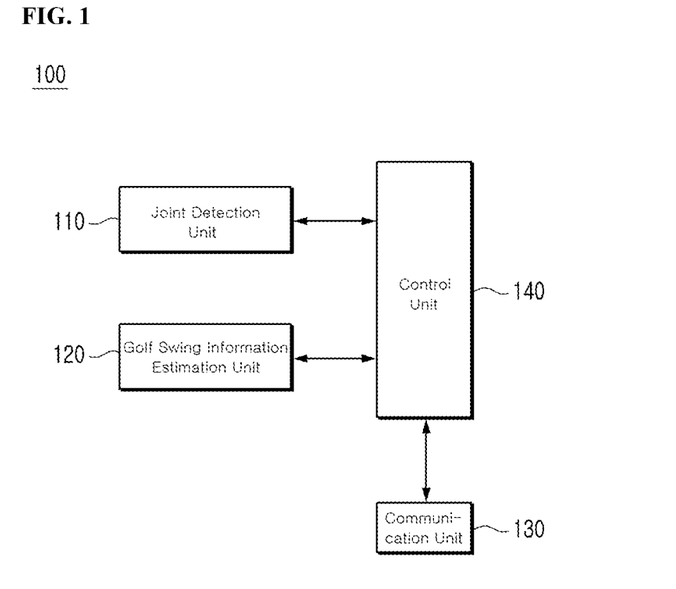
FIG. 1 specifically shows the internal configuration of a device according to one embodiment of the invention.

FIG. 1 specifically shows the internal configuration of a device according to one embodiment of the invention.

Hereinafter, the internal configuration of a device 100 crucial for implementing the invention and the functions of the respective components thereof will be discussed.

FIG. 1 specifically shows the internal configuration of the device 100 according to one embodiment of the invention.

As shown in FIG. 1, the device 100 according to one embodiment of the invention may comprise a joint detection unit 110, a golf swing information estimation unit 120, a communication unit 130, and a control unit 140. According to one embodiment of the invention, at least some of the joint detection unit 110, the golf swing information estimation unit 120, the communication unit 130, and the control unit 140 may be program modules to communicate with an external system. The program modules may be included in the device 100 in the form of operating systems, application program modules, or other program modules, while they may be physically stored in a variety of commonly known storage devices. Further, the program modules may also be stored in a remote storage device that may communicate with the device 100. Meanwhile, such program modules may include, but are not limited to, routines, subroutines, programs, objects, components, data structures, and the like for performing specific tasks or executing specific abstract data types as will be described below in accordance with the invention.

Meanwhile, the above description is illustrative although the device 100 has been described as above, and it will be apparent to those skilled in the art that at least a part of the components or functions of the device 100 may be implemented or included in an external system (not shown), as necessary.

Meanwhile, the device 100 according to one embodiment of the invention is digital equipment having a memory means and a microprocessor for computing capabilities, and may include smart phones, tablets, smart watches, smart bands, smart glasses, desktop computers, notebook computers, workstations, personal digital assistants (PDAs), web pads, and mobile phones. However, the device 100 is not limited to the examples mentioned above, and may be changed without limitation as long as the objects of the invention may be achieved.

Particularly, the device 100 may include an application (not shown) for assisting a user to receive services such as golf swing information estimation from the device 100. The application may be downloaded from a known web server (not shown).

First, the joint detection unit 110 according to one embodiment of the invention may function to, when a photographed image of a user's golf swing is acquired, detect at least one joint of the user from the photographed image using an artificial neural network model.

Specifically, the device 100 according to one embodiment of the invention may acquire a photographed image of a user's golf swing, wherein the photographed image of the user's golf swing may be photographed by the device 100, or may be photographed by another device (not shown) and provided to the device 100. Further, the joint detection unit 110 according to one embodiment of the invention may function to detect at least one joint of the user from the acquired photographed image of the user's golf swing using an artificial neural network model.

Here, the photographed image of the user's golf swing according to one embodiment of the invention may be an RGB image. That is, the joint detection unit 110 according to one embodiment of the invention may detect at least one joint of the user using only an RGB image of the user's golf swing, without using depth information acquired from an instrument such as a depth camera or a depth sensor.

Further, the at least one detected joint of the user according to one embodiment of the invention may be detected by reconstructing the photographed image of the user's golf swing into a heat map image in the artificial neural network model. That is, at least one heat map image may be generated for each of at least one joint of the user, and the joint detection unit 110 according to one embodiment of the invention may detect each joint from the at least one generated heat map image. (For example, the position of the brightest point in each heat map image may be detected as the position of the corresponding joint.)

In addition, the at least one detected joint of the user according to one embodiment of the invention may be joints essentially required for estimating information on the user's golf swing. That is, when the information on the user's golf swing is estimated, the computational efficiency of the artificial neural network model may be improved by limiting the number of joints to be detected such that joints of relatively low importance are not detected.

Meanwhile, the artificial neural network model according to one embodiment of the invention may include, for example, a convolutional neural network (CNN) model, a recurrent neural network (RNN) model, a deep belief network (DBN) model, or an artificial neural network model in which the foregoing models are combined. However, the artificial neural network model according to one embodiment of the invention is not limited to those mentioned above, and may be diversely changed as long as the objects of the invention may be achieved.

Further, the artificial neural network model according to one embodiment of the invention may be a model that is light-weighted using depthwise convolution and pointwise convolution.

In addition, the artificial neural network model according to one embodiment of the invention may be a model that is light-weighted using a light-weighting algorithm such as pruning, weight quantization, and residual learning.

Specifically, since artificial neural network models commonly used in object recognition technology require a high level of computing resources to be consumed for a high level of recognition performance, it is often difficult to use such models in environments where only limited computing resources are provided (e.g., mobile devices). Therefore, according to one embodiment of the invention, an artificial neural network model may be light-weighted using depthwise convolution and pointwise convolution, and the light-weighted artificial neural network model may be used in a mobile device so that at least one joint of a user may be detected from a photographed image of the user's golf swing.

Here, the depthwise convolution according to one embodiment of the invention may refer to a convolution process in which a kernel is applied for each depth (i.e., each channel) of an input layer, in performing convolution in the artificial neural network model according to one embodiment of the invention. Meanwhile, since the method of operation using the applied kernel is the same as that of general convolution, a detailed description thereof will be omitted.

Further, the pointwise convolution according to one embodiment of the invention may refer to a convolution process in which a kernel of size 1×1×M (i.e., a kernel of width 1, height 1, and depth M) is applied for each point of an input layer, in performing convolution in the artificial neural network model according to one embodiment of the invention.

Figure 2A:
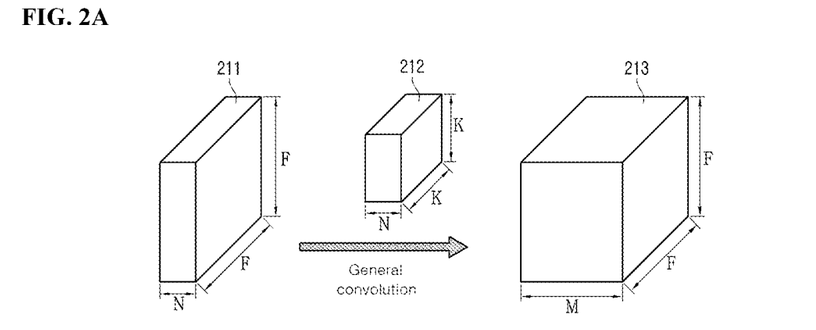
FIG. 2A illustratively shows how general convolution is performed according to one embodiment of the invention.

FIG. 2A illustratively shows how general convolution is performed according to one embodiment of the invention.

Figure 2B:
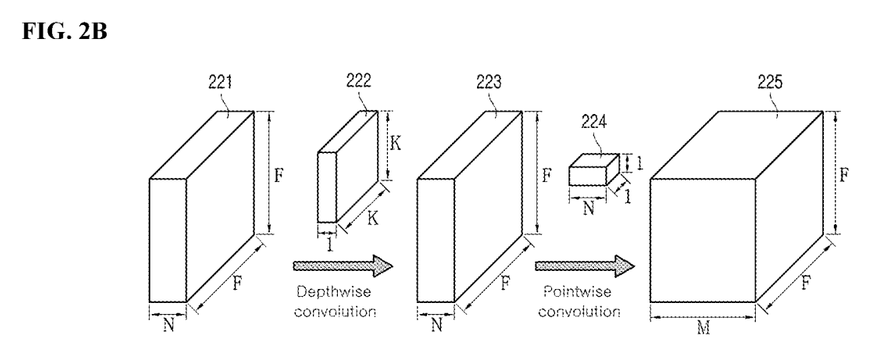
FIG. 2B illustratively shows how depthwise convolution and pointwise convolution are performed according to one embodiment of the invention.

FIG. 2B illustratively shows how depthwise convolution and pointwise convolution are performed according to one embodiment of the invention.

Referring to FIG. 2A, according to one embodiment of the invention, it may be assumed that the width, height, and depth of an input layer 211 are F, F, and N, respectively; the width, height, and depth of each kernel 212 are K, K, and N, respectively; and the width, height, and depth of an output layer 213 are F, F, and M, respectively. Here, it is assumed that padding and stride are appropriately sized such that there is no change in the width and height of the input layer 211 and the output layer 213. In this case, in the general convolution, the kernel 212 is applied to the input layer 211 to constitute one depth of the output layer 213 (through F×F×K×K×N operations), and these operations are performed for M kernels 212 so that a total of F×F×K×K×N×M operations are performed.

Referring to FIG. 2B, according to one embodiment of the invention, it may be assumed that the width, height, and depth of an input layer 221 are F, F, and N, respectively; the width, height, and depth of each kernel 222 in the depthwise convolution are K, K, and 1, respectively; the width, height, and depth of each kernel 224 in the pointwise convolution are 1, 1, and N, respectively; and the width, height and depth of an output layer 225 are F, F, and M, respectively. In this case, the kernel 222 is applied for each depth of the input layer 221 to constitute each depth of an intermediate layer 223 (through F×F×K×K×1×N operations). Then, the kernel 224 is applied for each point of the intermediate layer 223 to constitute one depth of the output layer 225 (through F×F×1×1×N operations), and these operations are performed for M kernels 224 so that a total of F×F×1×1×N×M operations are performed in the pointwise convolution. Therefore, according to one embodiment of the invention, a total of (F×F×K×K×1×N)+(F×F×1×1×N×M) operations are performed in the depthwise convolution and the pointwise convolution, so that the amount of operations is reduced compared to the general convolution.

Meanwhile, the light-weighting algorithms according to one embodiment of the invention are not necessarily limited to the above algorithms (i.e., the depthwise convolution and the pointwise convolution), and the order or number of times of applying each of the above algorithms may also be diversely changed.

Next, the golf swing information estimation unit 120 according to one embodiment of the invention may function to estimate information on the user's golf swing with reference to a position of the at least one joint of the user detected by the joint detection unit 110 according to one embodiment of the invention.

Specifically, the golf swing information estimation unit 120 according to one embodiment of the invention may function to estimate a posture of the user with reference to at least one of a type of the at least one joint of the user detected by the joint detection unit 110 according to one embodiment of the invention, a position of the at least one joint of the user, a distance between the at least one joint of the user and at least one other joint of the user, and an angle formed between the at least one joint of the user and at least one other joint of the user, and to estimate information on the user's golf swing from the estimated posture.

Here, the information on the user's golf swing according to one embodiment of the invention may include information on the user's swing speed, swing tempo, swing plane, cocking, swing posture, and the like. However, the information on the golf swing according to one embodiment of the invention is not limited to those mentioned above, and may be diversely changed as long as the objects of the invention may be achieved.

Meanwhile, the golf swing information estimation unit 120 according to one embodiment of the invention may function to estimate information on a golf club with reference to the position of the at least one joint of the user detected by the joint detection unit 110 according to one embodiment of the invention, and to estimate the information on the user's golf swing with further reference to the estimated information on the golf club.

Specifically, the golf swing information estimation unit 120 according to one embodiment of the invention may estimate the information on the golf club with reference to at least one of a type of the at least one joint of the user detected by the joint detection unit 110 according to one embodiment of the invention, a position of the at least one joint of the user, a distance between the at least one joint of the user and at least one other joint of the user, and an angle formed between the at least one joint of the user and at least one other joint of the user.

Further, the information on the golf club according to one embodiment of the invention may include, but is not limited to, a position of the golf club, an angle between a body part of the user and the golf club, and the like.

Meanwhile, the information on the golf swing according to one embodiment of the invention may be estimated separately for each partial motion constituting the golf swing.

Specifically, the golf swing according to one embodiment of the invention may be composed of seven stages of partial motions such as an address, a back swing, a top-of-swing, a down swing, an impact, a follow-through, and a finish. Further, with reference to at least one of a type of the at least one joint of the user detected by the joint detection unit 110 according to one embodiment of the invention, a position of the at least one joint of the user, a distance between the at least one joint of the user and at least one other joint of the user, and an angle formed between the at least one joint of the user and at least one other joint of the user, the golf swing information estimation unit 120 according to one embodiment of the invention may derive to which of the above seven stages the photographed image of the user's golf swing corresponds, or extract at least one frame corresponding to a specific stage of the above seven stages from the photographed image of the user's golf swing. Accordingly, the golf swing information estimation unit 120 according to one embodiment of the invention may function to estimate the information on the user's golf swing separately for each partial motion constituting the golf swing.

Meanwhile, the golf swing according to one embodiment of the invention is not necessarily separated into the seven stages as described above. That is, it may be separated to further include detailed stages constituting each of the seven stages, or such that at least some of the seven stages constitute one stage.

Meanwhile, according to one embodiment of the invention, storage of the photographed image may be started when a posture of the user estimated with reference to the position of the at least one joint detected by the joint detection unit 110 according to one embodiment of the invention satisfies a predetermined storage start condition, and the storage of the photographed image may be ended when the posture of the user satisfies a predetermined storage end condition.

Specifically, as described above, the golf swing information estimation unit 120 according to one embodiment of the invention may estimate a posture of the user with reference to at least one of a type of the at least one joint of the user detected by the joint detection unit 110 according to one embodiment of the invention, a position of the at least one joint of the user, a distance between the at least one joint of the user and at least one other joint of the user, and an angle formed between the at least one joint of the user and at least one other joint of the user. Further, when the estimated posture of the user satisfies a predetermined storage start condition or a predetermined storage end condition, storage of the photographed image may be started or ended.

In addition, at least one of a predetermined storage start condition and a predetermined storage end condition according to one embodiment of the invention may be displayed on the device 100 in the form of guide lines and provided to the user.

Figure 3:
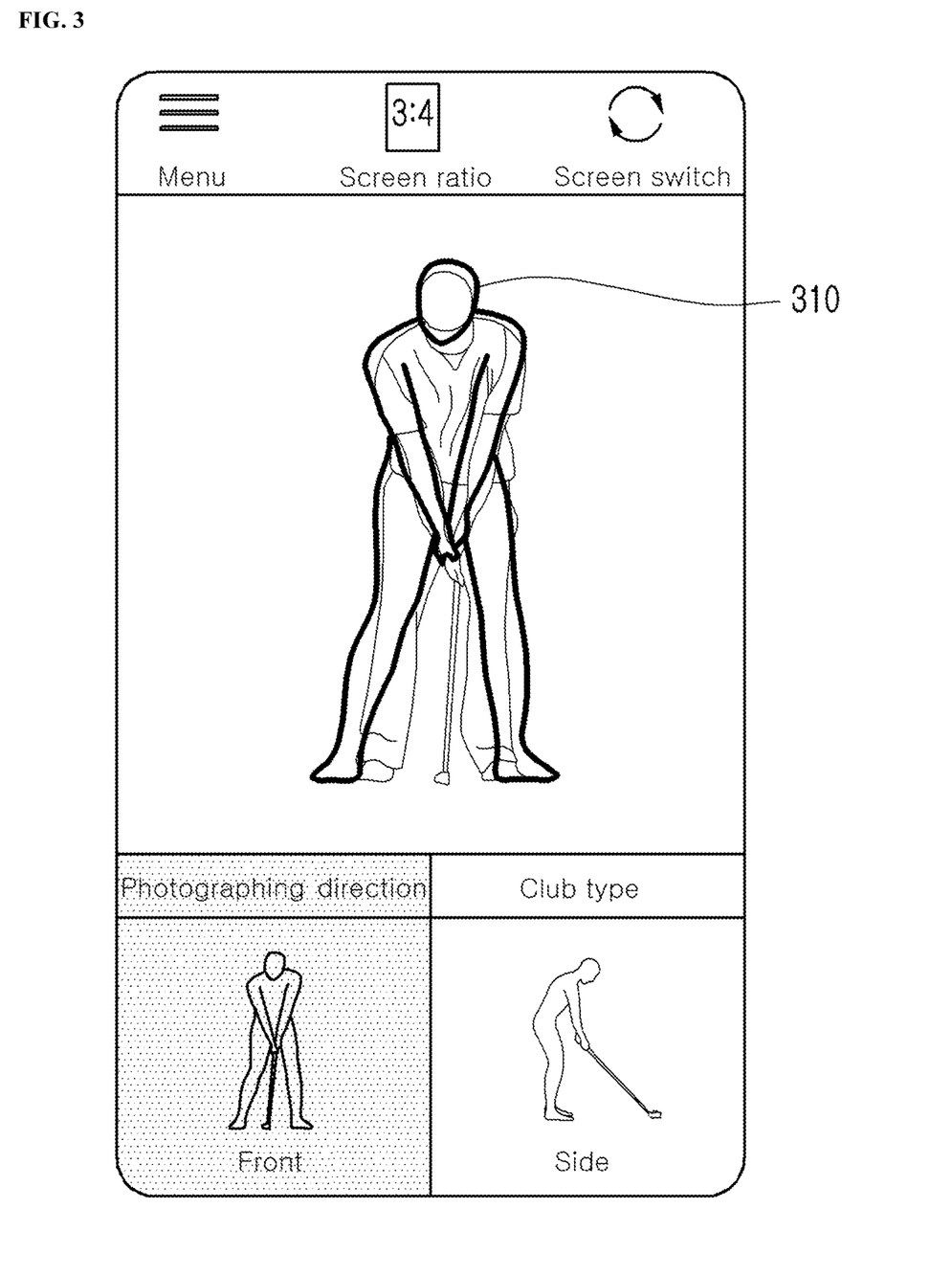
FIG. 3 illustratively shows a screen in which a storage start condition according to one embodiment of the invention is displayed in the form of guide lines and provided to a user.

FIG. 3 illustratively shows a screen in which a storage start condition according to one embodiment of the invention is displayed in the form of guide lines and provided to a user.

Referring to FIG. 3, according to one embodiment of the invention, the user may receive a storage start condition in the form of guide lines 310 through the device 100. Further, when the user's posture estimated by the golf swing information estimation unit 120 according to one embodiment of the invention is similar to the guide lines 310 at or above a predetermined level, the storage start condition is determined to be satisfied and storage of the photographed image may be started.

Meanwhile, when there is at least one frame that is determined to be unnecessary in estimating information on the user's golf swing from the stored image, a stored image management unit (not shown) according to one embodiment of the invention may function to cut out the at least one frame from the stored image.

For example, according to one embodiment of the invention, it may be assumed that a predetermined or longer time elapses while the user is in an address posture so that a predetermined number or more of frames corresponding to the address stage are included in the photographed image of the user's golf swing (i.e., the address posture is maintained too long so that unnecessary images are stored). In this case, the stored image management unit (not shown) according to one embodiment of the invention may leave only a predetermined number of frames preceding a frame in which a back swing is started, and cut out other frames preceding the predetermined number of frames, among the frames corresponding to the address stage, from the stored image.

Meanwhile, according to one embodiment of the invention, at least one of the steps of detecting the at least one joint of the user from the photographed image and estimating the information on the user's golf swing with reference to the position of the at least one detected joint may be performed according to a result of recognizing a voice from the user.

For example, according to one embodiment of the invention, a situation may be assumed in which information on a user's golf swing is estimated and provided to the user through the device 100. In this case, upon checking the provided information, the user may control the device 100 through a voice command, without operating the device 100 separately, such that the device 100 may perform at least one of the steps of detecting the at least one joint of the user from the photographed image and estimating the information on the user's golf swing with reference to the position of the at least one detected joint.

Next, the communication unit 130 according to one embodiment of the invention may function to enable data transmission/reception from/to the joint detection unit 110 and the golf swing information estimation unit 120.

Lastly, the control unit 140 according to one embodiment of the invention may function to control data flow among the joint detection unit 110, the golf swing information estimation unit 120, and the communication unit 130. That is, the control unit 140 according to the invention may control data flow into/out of the device 100 or data flow among the respective components of the device 100, such that the joint detection unit 110, the golf swing information estimation unit 120, and the communication unit 130 may carry out their particular functions, respectively.

Figure 4A:
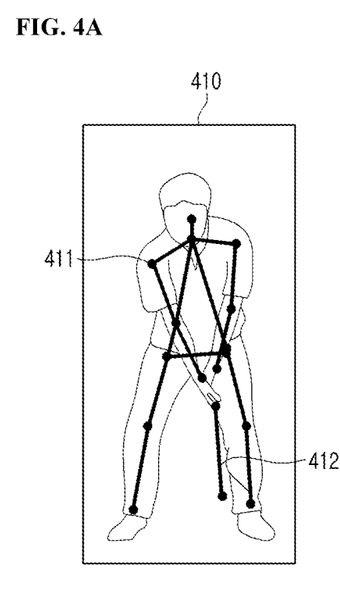
FIG. 4A illustratively shows a visual representation of at least one joint of a user detected according to one embodiment of the invention and information on a golf club estimated according to one embodiment of the invention.
Figure 4B:
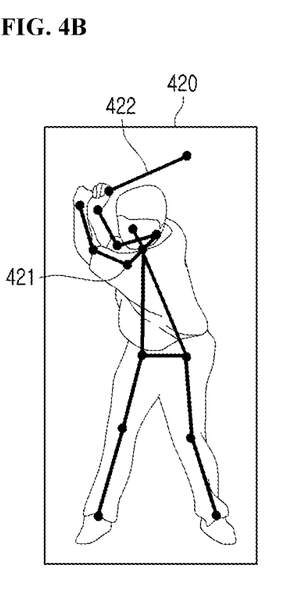
FIG. 4B illustratively shows a visual representation of at least one joint of a user detected according to one embodiment of the invention and information on a golf club estimated according to one embodiment of the invention.
Figure 4C:
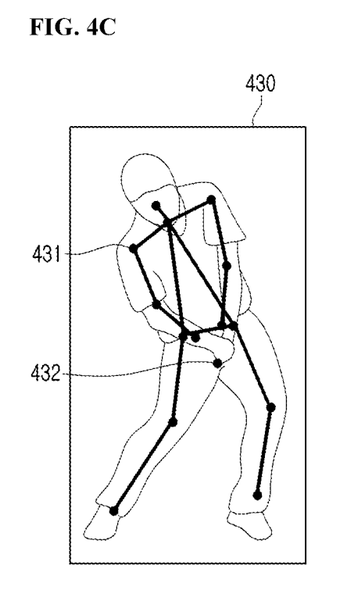
FIG. 4C illustratively shows a visual representation of at least one joint of a user detected according to one embodiment of the invention and information on a golf club estimated according to one embodiment of the invention.

FIGS. 4A to 4C illustratively show a visual representation of at least one joint of a user detected according to one embodiment of the invention and information on a golf club estimated according to one embodiment of the invention.

Referring to FIGS. 4A to 4C, according to one embodiment of the invention, photographed images 410, 420, and 430 of the user's golf swing may be acquired, and the photographed images may be RGB images photographed through the user's mobile device.

Referring further to FIGS. 4A to 4C, the joint detection unit 110 according to one embodiment of the invention may detect at least one joint 411, 421, and 431 of the user from the photographed images using an artificial neural network model that is light-weighted to be implemented in the mobile device. Further, the golf swing information estimation unit 120 according to one embodiment of the invention may estimate a position and an angle 412, 422, and 432 of the golf club with reference to a position of the at least one detected joint.

Figure 5:
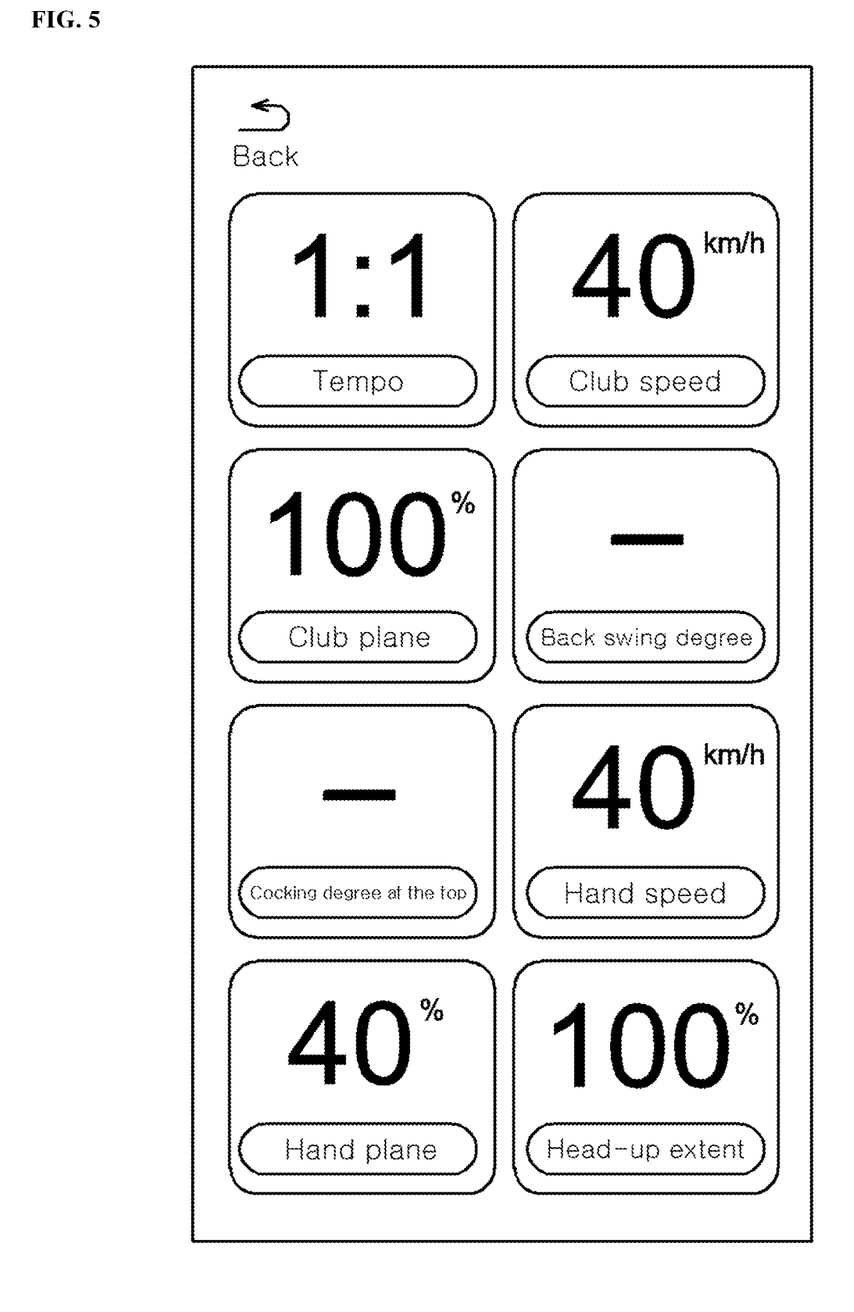
FIG. 5 illustratively shows a screen in which information on a user's golf swing estimated according to one embodiment of the invention is provided to the user.

FIG. 5 illustratively shows a screen in which information on a user's golf swing estimated according to one embodiment of the invention is provided to the user.

Referring to FIGS. 4A to 4C and 5, the golf swing information estimation unit 120 according to one embodiment of the invention may estimate information on the user's golf swing with reference to the position of the at least one joint 411, 421, and 431 of the user detected by the joint detection unit 110 according to one embodiment of the invention. Further, the estimated information may be estimated separately for each partial motion constituting the golf swing. For example, information on an address stage may be estimated in FIG. 4A, information on a top-of-swing stage may be estimated in FIG. 4B, and information on an impact stage may be estimated in FIG. 4C, respectively.

Referring further to FIGS. 4A to 4C and 5, when an amount of time taken for each partial motion, an angle formed by the joints in each partial motion, and the like are estimated by the golf swing information estimation unit 120 according to one embodiment of the invention, a result of the estimation may be processed in the form as shown in FIG. 5 and provided to the user.

The embodiments according to the invention as described above may be implemented in the form of program instructions that can be executed by various computer components, and may be stored on a computer-readable recording medium. The computer-readable recording medium may include program instructions, data files, and data structures, separately or in combination. The program instructions stored on the computer-readable recording medium may be specially designed and configured for the present invention, or may also be known and available to those skilled in the computer software field. Examples of the computer-readable recording medium include the following: magnetic media such as hard disks, floppy disks and magnetic tapes; optical media such as compact disk-read only memory (CD-ROM) and digital versatile disks (DVDs); magneto-optical media such as floptical disks; and hardware devices such as read-only memory (ROM), random access memory (RAM) and flash memory, which are specially configured to store and execute program instructions. Examples of the program instructions include not only machine language codes created by a compiler, but also high-level language codes that can be executed by a computer using an interpreter. The above hardware devices may be changed to one or more software modules to perform the processes of the present invention, and vice versa.

Although the present invention has been described above in terms of specific items such as detailed elements as well as the limited embodiments and the drawings, they are only provided to help more general understanding of the invention, and the present invention is not limited to the above embodiments. It will be appreciated by those skilled in the art to which the present invention pertains that various modifications and changes may be made from the above description.

Therefore, the spirit of the present invention shall not be limited to the above-described embodiments, and the entire scope of the appended claims and their equivalents will fall within the scope and spirit of the invention.

What is claimed is:

1. A method performed in a mobile device for estimating information on a golf swing, the mobile device comprising a camera, a screen, a memory storing an artificial neural network model, and one or more processors, and the method comprising the steps of:

by the one or more processors, acquiring a photographed image of a user's golf swing captured by the camera, and detecting at least one joint of the user from the photographed image using the artificial neural network model;

by the one or more processors, estimating information on the user's golf swing with reference to a position of the at least one detected joint separately for each partial motion constituting the golf swing; and by the one or more processors, displaying the estimated information on the user's golf swing for each partial motion on the screen of the mobile device, wherein the artificial neural network model includes a plurality of kernels applied with respect to a depth or point of at least one layer included in convolution layers, wherein in the estimating step, information on a golf club is estimated with reference to the position of the at least one detected joint, and the information on the user's golf swing is estimated with further reference to the estimated information on the golf club, wherein in the estimating step, a partial motion to which the photographed image corresponds is determined with reference to the position of the at least one detected joint, and at least one frame corresponding to the determined partial motion is extracted from the photographed image, wherein storage of the acquired photographed image in the memory is started when a posture of the user estimated with reference to the position of the at least one detected joint satisfies a predetermined storage start condition, and the storage of the acquired photographed image in the memory is ended when a posture of the user estimated with reference to the position of the at least one detected joint satisfies a predetermined storage end condition, wherein at least one of the storage start condition and the storage end condition is displayed on the screen of the mobile device in the form of guide lines, and wherein in response to a number of frames corresponding to a specific partial motion being not less than a number of frames necessary in estimating the information on the user's golf swing, other frames than a predetermined number of frames preceding a frame in which a partial motion following the specific partial motion is started, among the frames corresponding to the specific partial motion, are cut out from the stored image in the memory.

2. The method of claim 1, further comprising the step of, by the one or more processors, light-weighting the artificial neural network model using depthwise convolution and pointwise convolution to obtain a light-weighted artificial neural network model, wherein the at least one joint of the user is detected from the photographed image using the light-weighted artificial neural network model.

3. The method of claim 2, wherein a depth of each kernel in the depthwise convolution is reduced to 1 and each of a width and a height of each kernel in the pointwise convolution is reduced to 1.

4. The method of claim 1, wherein at least one of the detecting step and the estimating step is performed according to a result of recognizing a voice from the user.

5. A non-transitory computer-readable recording medium having stored thereon a computer program for executing the method of claim 1.

6. A mobile device for estimating information on a golf swing, the mobile device comprising a camera, a screen, a memory storing an artificial neural network model, and one or more processors configured to:
   acquire a photographed image of a user's golf swing captured by the camera, and detect at least one joint of the user from the photographed image using the artificial neural network model;
   estimate information on the user's golf swing with reference to a position of the at least one detected joint separately for each partial motion constituting the golf swing; and
   display the estimated information on the user's golf swing for each partial motion on the screen of the mobile device,
   wherein the artificial neural network model includes a plurality of kernels applied with respect to a depth or point of at least one layer included in convolution layers,
   wherein the one or more processors are configured to estimate information on a golf club with reference to the position of the at least one detected joint, and estimate the information on the user's golf swing with further reference to the estimated information on the golf club,
   wherein the one or more processors are configured to determine a partial motion to which the photographed image corresponds with reference to the position of the at least one detected joint, and extract at least one frame corresponding to the determined partial motion from the photographed image,
   wherein the one or more processors are configured to start storage of the acquired photographed image in the memory when a posture of the user estimated with reference to the position of the at least one detected joint satisfies a predetermined storage start condition, and end the storage of the acquired photographed image in the memory when a posture of the user estimated with reference to the position of the at least one detected joint satisfies a predetermined storage end condition,
   wherein the one or more processors are configured to display at least one of the storage start condition and the storage end condition on the screen of the mobile device in the form of guide lines, and
   wherein the one or more processors are configured to, in response to a number of frames corresponding to a specific partial motion being not less than a number of frames necessary in estimating the information on the user's golf swing, cut out other frames than a predetermined number of frames preceding a frame in which a partial motion following the specific partial motion is started, among the frames corresponding to the specific partial motion, from the stored image in the memory.

7. The device of claim 6, wherein the one or more processors are configured to
   light-weight the artificial neural network model using depthwise convolution and pointwise convolution to obtain a light-weighted artificial neural network model, and
   wherein the at least one joint of the user is detected from the photographed image using the light-weighted artificial neural network model.

8. The device of claim 7, wherein a depth of each kernel in the depthwise convolution is reduced to 1 and each of a width and a height of each kernel in the pointwise convolution is reduced to 1.

* * * * *